United States Patent
Pottharst, Jr.

[15] 3,686,451
[45] Aug. 22, 1972

[54] LIQUID LEVEL CONTROL ASSEMBLY

[72] Inventor: John E. Pottharst, Jr., 861 Carondelet St., New Orleans, La. 70130

[22] Filed: Feb. 1, 1971

[21] Appl. No.: 111,180

[52] U.S. Cl. ................... 200/84 R, 73/317, 340/244
[51] Int. Cl. ............................................. H01h 35/18
[58] Field of Search .............. 200/84 R; 73/317, 313; 340/244 B

[56] References Cited

UNITED STATES PATENTS

| 2,877,318 | 3/1959 | Culley | 200/84 R |
| 2,878,335 | 3/1959 | Vitu | 200/84 R |
| 3,134,866 | 5/1964 | Murphy et al. | 200/84 R |

Primary Examiner—David Smith, Jr.
Attorney—Hyer, Eickenroht, Thompson & Turner

[57] ABSTRACT

The liquid level control assembly disclosed includes a housing adapted for mounting in the wall of a vessel containing corrosive liquid or vapor. The housing has a control section and an opening connecting the inside of the vessel with the control section. An L-shaped shaft has one leg in the vessel upon which a float is mounted. The other leg extends through the opening in the housing into the control section. When a change in liquid level moves the float to a given level, the rotation of the shaft actuates a control element, such as an electrical switch, mounted in the control section of the housing. Two sealing elements made of a material, such as Teflon, that has a low coefficient of friction and is corrosion resistant support the shaft for rotation so that the switch assembly will operate for extended periods in the vessel with little, if any, increase in the force required to rotate the shaft.

5 Claims, 4 Drawing Figures

PATENTED AUG 22 1972
3,686,451
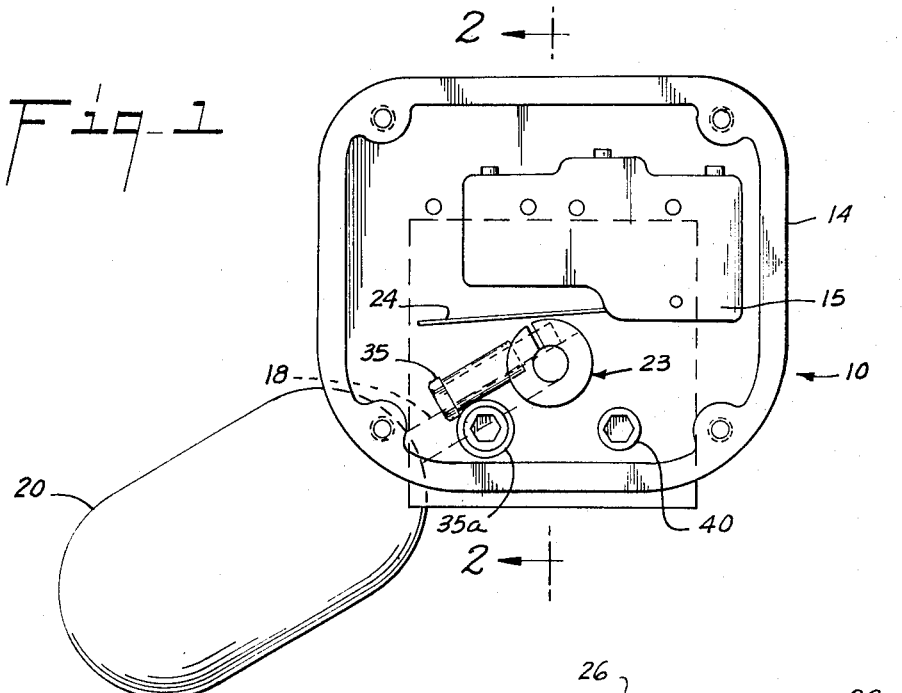
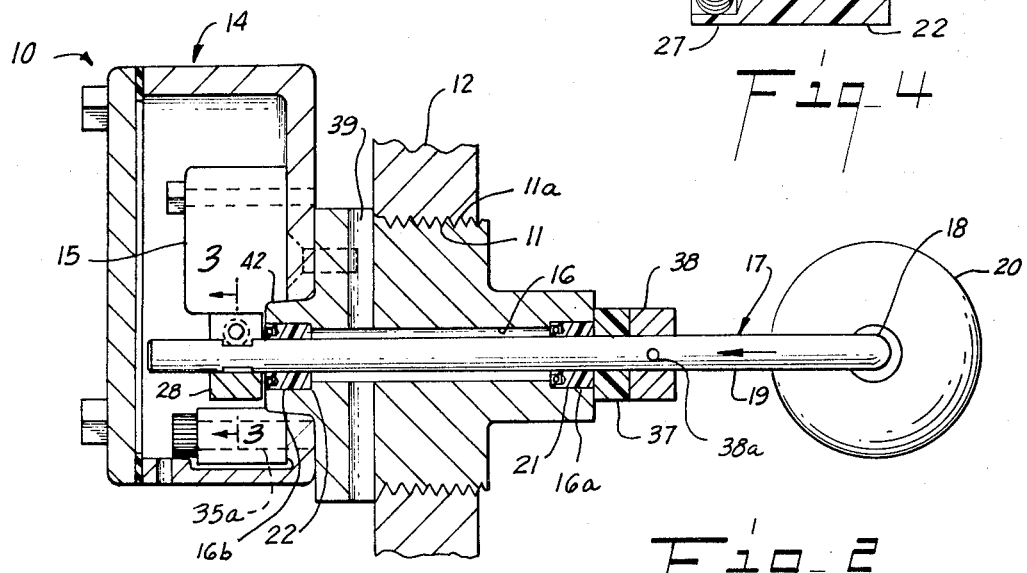
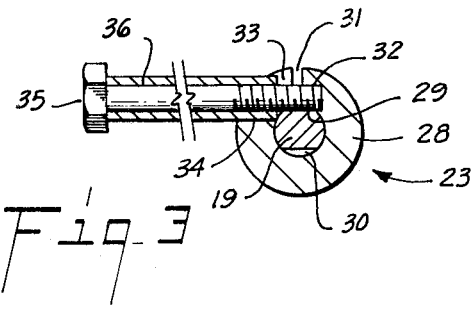
JOHN E. POTTHARST, JR.
INVENTOR.
BY Hye, Eckenroht,
Thompson + Turner
ATTORNEYS

LIQUID LEVEL CONTROL ASSEMBLY

This invention relates to liquid level control assemblies that are especially adapted to operate in a corrosive or scale-forming environment.

Liquid level control assemblies include a control element that is actuated when the liquid in the vessel reaches a given level. A float rotates a shaft in response to changes in the liquid level, which actuates the control element when the liquid reaches the preselected level. It is desirable that such floats be as small as possible. As the size of the float goes down, however, the buoyant force exerted on the float by the liquid goes down also. Thus it is important for the frictional forces resisting rotation of the shaft to be kept to a minimum.

In vessels containing corrosive, scale-forming liquids and vapors, such as hot sea water, there is not only the problem of corrosion, but also scale is deposited on everything in the vessel that offers a surface to which it will adhere. With hot salt water, this problem is so severe that the vessels containing it must be descaled with acid every other day. In the presence of such a corrosive liquid and vapor, the moving parts of liquid level control assemblies tend to corrode and become clogged with scale. Also, the corrosive liquids, such as salt water and acid, are particularly harmful to any metallic parts of the control element. The main problem, however, is the increase in torque required to rotate the shaft as the moving parts become corroded or covered with scale. The life of the control assembly then depends on how long the buoyant force of the float can overcome the increased resistance to rotation of the shaft. In hot salt water service, this can be a relatively short time.

It is an object of this invention to mount the shaft of a liquid level control assembly on sealing elements that have a low coefficient of friction and that are corrosion resistant so that the force with which the sealing elements resist the rotation of the shaft remains substantially constant during the life of the control assembly.

It is another object of this invention to provide a liquid level control assembly in which the actuating shaft of the assembly is supported for rotation on the seals used to keep liquid or vapor from leaking from the vessel.

It is another object of this invention to prevent the corrosive fluid or vapor from the vessel from contacting the control element.

The invention will now be described in detail in connection with the attached drawings, in which:

FIG. 1 is a side view in elevation of the preferred embodiment of the liquid level control assembly of this invention with a portion of the housing removed;

FIG. 2 is a sectional view of the liquid level control assembly of FIG. 1 taken along line 2—2 with the float in position to actuate the control element;

FIG. 3 is a sectional view taken along line 3—3 of FIG. 2; and

FIG. 4 is a sectional view on an enlarged scale of one of the sealing elements shown in FIG. 2.

The liquid level control assembly includes housing 10 that is adapted to be mounted in an opening in the side of a vessel, such as opening 11 in vessel wall 12. In the embodiment shown, the housing and the opening in the vessel wall are provided with threads 11a to hold the housing in the opening. Housing 10 includes control section 14 where a control element, which in the embodiment shown is microswitch 15, is mounted. The control element may be an electrical switch, a pneumatic actuator, or any element that sounds an alarm, shuts off a pump, operates a valve, or performs some other control function in response to the liquid in the vessel reaching a particular level.

Opening 16 connects the inside of the vessel with housing control section 14. Shaft 17 is L-shaped having legs 18 and 19 that are connected at one end with their longitudinal axes approximately perpendicular. Leg 19 extends through opening 16 in the housing into housing control section 14. Float 20 is attached to the free end of leg 18 to be positioned inside the vessel when the control assembly is mounted in the wall of a vessel. The float rides on the surface of the liquid in the vessel and rotates the shaft to a position to actuate microswitch 15, in a manner to be described below, when the level of the liquid in the vessel reaches a predetermined height.

Means are provided to support shaft 17 for rotation in housing opening 16 and for preventing liquid or vapor from flowing from the vessel through the opening in the housing. The support means includes first sealing element 21 located in opening 16 to prevent the flow of liquid or vapor through this opening and to support the shaft for rotation. Second sealing element 22 is positioned between first sealing element 21 and microswitch 15 to also support the shaft for rotation and to prevent any liquid or vapor leaking through the first sealing element from flowing into housing control section 14 where microswitch 15 is mounted. In the embodiment shown, the first and second sealing elements are located in opposite ends of opening 16 in sections 16a and 16b of increased diameter, respectively. The increased diameter of these sections provides shoulders to hold the sealing elements from moving further into opening 16. This is particularly important for sealing element 21, which may be subjected to a pressure differential tending to urge the element along the shaft.

In accordance with one of the features of this invention, the frictional resistance of the sealing elements to rotation of the shaft remains substantially constant even though the shaft and sealing elements are exposed to corrosive or scale-forming liquids and vapors for long periods of time. To accomplish this, sealing elements 21 and 22 are made of a material having a coefficient of friction substantially that of polytetrafluoroethylene, one example of which is known by the trademark Teflon. This material, such as Teflon, is corrosion resistant and will resist the formation of scale on its surface when exposed to most of the corrosive and scale-forming liquids. Therefore, the frictional resistance of the sealing element to rotation of the shaft will remain substantially constant even though the shaft and sealing elements are exposed to corrosive or scale-forming liquids and vapors for long periods of time. For example, one liquid level control assembly embodying this invention was built. It had a float about 3 inches long and about 1 ½ inches in diameter which was mounted on a shaft leg, such as shaft leg 19 in the drawings, about 5 inches long. The sealing elements were made of Teflon. The frictional resistance of the Teflon sealing elements did not increase because the element did not corrode or scale; thus, the buoyant force of the liquid was sufficient to rotate the shaft and thus actuate a microswitch which was rated at fifteen amps.

The sealing element used in the embodiment constructed is sold under the trademark Tec-seal, Part No. A 01186, manufactured by Tec-Seal Corporation. This sealing element is shown in cross section on an enlarged scale in FIG. 4. It comprises annular body 22a of Teflon to encircle shaft 17 and support it for rotation with a minimum of frictional resistance. One end of body 22a is grooved to provide sealing surfaces 26 and 27. Garter spring 25 is located in the groove and has a diameter such that the sealing surfaces are held against the shaft and opening sufficiently to provide a seal against the escape of fluids from the vessel. To increase the life of the spring, even thought it is made of corrosion-resistant material, it is positioned on the opposite side of the sealing surfaces from the fluids in the vessel.

Means are mounted on the shaft in the control section to actuate the control upon rotation of the shaft. In the embodiment shown, shaft leg 19 has transverse grooves 29 and 30. Collar 28 is positioned on the shaft over the grooves. The collar is radially split at 31 and has an opening that is equal to or larger than the shaft. Tapped hole 32 is located in the collar on one side of split 31. Its longitudinal axis is parallel to the flat bottom surface of groove 29. Hole 33, with counterbore 34, is located in the collar on the other side of the split. The longitudinal axes of the two holes coincide. Locking screw 35 extends through hole 33 and threadedly engages tapped hole 32. Sleeve 36 is mounted thereon to engage the bottom of counterbore 34 and the head of the screw and limit the distance the screw can extend through hole 33. The axis of hole 33 and tapped hole 32 is spaced from shaft groove 29 such that the locking screw and the flat surface of the groove coact to hold the collar and the shaft in a fixed angular relationship with respect to float 20. Locking screw 35 also serves to engage switch lever 24 and actuate switch 15 when the liquid in the vessel has moved float 20 to the position shown in FIG. 2.

Collar 28 also serves to hold the shaft from axial movement out of opening 16 by engaging boss 42. A tendency for such movement of the shaft would exist if the vessel was operated elow atmospheric pressure. Usually, however, the pressure in the vessel will be equal to or greater than atmospheric, and preferably a slight clearance exists between the collar and the boss to avoid adding any additional resistance to the rotation of shaft 17. In the embodiment shown in the drawings, mounting screw 35a that mounts the control section of the housing to the rest of the housing provides a stop to limit the movement of the float downward when the liquid level drops below the float.

If the vessel is operating at a pressure above atmospheric, there will be a force tending to move shaft 17 to the left, as viewed in FIG. 2. Therefore, means are provided to hold the shaft against such movement. In the embodiment shown, thrust bushing 37 is mounted on shaft leg 19 between float 20 and housing 10. The bushing is held in position on the shaft and against movement axially of the shaft toward the float by shaft collar 38, which is secured to the shaft by pin 38a. The thrust bushing engages the housing and holds the shaft against axial movement toward the housing. This arrangement produces a minimal increase in the frictional forces resisting rotation of the shaft when the bushing is made of the same type of corrosion-resistant material used for the sealing elements, due to its low coefficient of friction. In addition, if the vessel does have a positive pressure, bushing 37, if made of a material such as Teflon, will form a seal between it and the surface area of the housing it engages and thereby keep this part of the housing from being exposed to the corrosive or scale-forming fluids in the vessel.

Tattle-tale hole 39 connects shaft opening 15 between first and second sealing elements 21 and 22 with the outside of the outside portion of the housing so that corrosive liquid leaking through the first sealing element 21 will flow out of the housing thereby indicating to an observer that the first seal is leaking.

The liquid level control assembly is shown in left-hand operation in response to a rise in liquid level; that is, the float is rotated clockwise to the left of the axis of rotation of shaft leg 19 as viewed in FIG. 1. For various reasons, such as the configuration of the vessel, right-hand operation of the control assembly in response to a rise in liquid level may be desired. This may be accomplished by positioning the radial split in collar 28 over transverse groove 30 on the bottom side of shaft leg 19 and inserting screw 35 with sleeve 36 into the collar in alignment with groove 30. Float 20 and locking screw 35 are then positioned to the right of the axis of rotation of shaft leg 19. Microswitch 15 is turned around and mounted such that lever 24 extends toward the right instead of the left as shown in FIG. 1. In the right-hand position, housing screw 40 supports locking screw 35 in its rest position.

The embodiment of the liquid level control assembly discussed heretofore is designed to actuate microswitch 15 in response to a rise in the level of the liquid in the vessel. This liquid level control assembly may also be adjusted by any person skilled in the art to respond to a drop in the level of a liquid in the vessel.

From the foregoing, it will be seen that this invention is one well adapted to attain all of the ends and objects hereinabove set forth, together with other advantages that are obvious and that are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A liquid level control assembly especially adapted for use in a vessel containing a liquid or vapor that may be corrosive or tends to cause scale deposits, comprising a housing, adapted to be mounted on a vessel, having a control section and an opening connecting the inside of the vessel with the control section, a control mounted in the control section of the housing, a shaft extending through the opening in the housing such that the shaft extends into the vessel and into the housing control section, means mounted on the shaft in the control section to actuate the control upon rotation of the shaft and a float attached to the shaft inside the vessel to float on the surface of the liquid to rotate the shaft and actuate the control when the liquid in the vessel reaches a given level, first and second spaced apart sealing means located in the opening to respectively prevent flow from the vessel through the opening and from the opening into the control section of the housing, said first and second sealing means supporting the shaft for rotation within the housing opening substantially free from frictional contact of the shaft with the housing, said sealing means being of a material that has a coefficient of friction substantially that of polytetrafluoroethylene and that will not corrode when exposed to the liquid and vapor in the vessel so that the frictional resistance of said sealing means to rotation of the shaft will remain substantially constant even though the shaft and sealing element are exposed to corrosive or scale forming liquids and vapors.

2. The liquid level control assembly of claim 1 in which the shaft is generally L-shaped and has first and second legs, the first leg of the shaft extends into the housing, and the float is attached to the second leg, the first leg of the shaft having a transverse groove with a flat bottom surface at a predetermined angular relationship with the longitudinal axis of the second leg of the shaft, and in which said actuating means includes a collar mounted on said shaft over the groove, the collar being radially split on one side, a tapped hole extending from one side of the split parallel to the flat surface on the shaft, a hole extending from the other side of the split with its longitudinal axis coinciding with the longitudinal axis of the tapped hole, a locking screw extending through the hole and threadedly engaging the tapped hole, said axes of the hole and tapped hole being spaced from the shaft such that the locking screw and the flat surface on the shaft will coact to hold the screw and the shaft in fixed angular relationship so that the locking screw will actuate the control each time the float rotates the shaft to a predetermined position.

3. The liquid level control assembly of claim 1 further provided with a thrust bushing of a corrosion-resistant material having a low coefficient of friction, such as polytetrafluoroethylene, mounted on the first leg of the shaft between the float and the housing and means holding the bushing against movement axially of the shaft and in position on the shaft to engage the inside portion of the housing and hold the shaft against axial movement toward the housing with a minimal increase in the frictional forces resisting rotation of the shaft by the float.

4. The liquid level control assembly of claim 1 further provided with a tattle-tale hole in the housing that connects the shaft opening between the first and second sealing elements with the outside of the housing so that corrosive liquid leaking through said first sealing element will flow out of the housing through the tattle-tale hole and indicate to an observer that the first seal is leaking.

5. The liquid level control assembly of claim 1 in which the control is an electrical switch.

* * * * *